United States Patent
Denomme et al.

(10) Patent No.: US 12,518,608 B2
(45) Date of Patent: Jan. 6, 2026

(54) METHOD AND SYSTEM TO MITIGATE VEHICULAR CONTACTS IN AUTONOMOUSLY MARSHALLED MANUFACTURING USING ULTRASONICS

(71) Applicant: Ford Global Technologies, LLC, Dearborn, MI (US)

(72) Inventors: Daniel Denomme, Farmington Hills, MI (US); Vivekananda Krishnamurthy, Van Buren Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 18/525,287

(22) Filed: Nov. 30, 2023

(65) Prior Publication Data

US 2025/0182601 A1   Jun. 5, 2025

(51) Int. Cl.
| | | |
|---|---|---|
| B60Q 1/00 | (2006.01) | |
| A41D 27/00 | (2006.01) | |
| A62B 99/00 | (2009.01) | |
| G01S 11/14 | (2006.01) | |
| G08B 21/02 | (2006.01) | |
| G08G 1/01 | (2006.01) | |
| G08G 1/09 | (2006.01) | |

(52) U.S. Cl.
CPC ............. *G08B 21/02* (2013.01); *A41D 27/00* (2013.01); *A62B 99/00* (2013.01); *G01S 11/14* (2013.01); *G08G 1/0116* (2013.01); *G08G 1/091* (2013.01)

(58) Field of Classification Search
CPC ........ G08B 21/02; A41D 27/00; A62B 99/00; G01S 11/14; G08G 1/0116; G08G 1/091
USPC ......................................................... 340/436
See application file for complete search history.

(56) References Cited

U.S. PATENT DOCUMENTS

| | | | |
|---|---|---|---|
| 9,747,796 B1 * | 8/2017 | De Beaufort | B60Q 9/008 |
| 9,847,036 B2 | 12/2017 | Colmenares | |
| 12,243,426 B2 * | 3/2025 | Naserian | G08G 1/161 |
| 12,372,637 B1 * | 7/2025 | Hajimiri | G01S 13/50 |
| 12,384,294 B2 * | 8/2025 | Okamoto | B60Q 9/008 |
| 2012/0119893 A1 * | 5/2012 | Cemper | G08B 21/0247 |
| | | | 340/425.5 |
| 2014/0357213 A1 * | 12/2014 | Tanaka | H04W 4/027 |
| | | | 455/404.1 |

(Continued)

FOREIGN PATENT DOCUMENTS

| | | |
|---|---|---|
| AU | 2021105372 | 10/2021 |
| CN | 109820695 | 5/2019 |

(Continued)

*Primary Examiner* — Tai T Nguyen
(74) *Attorney, Agent, or Firm* — Burris Law, PLLC

(57) ABSTRACT

A system for alerting a user against a vehicular contact includes an alerting device. The alerting device includes an ultrasonic receiver configured to receive ultrasonic signals emitted by an ultrasonic transmitter of a vehicle, and an intensity determination module configured to determine whether an intensity of the ultrasonic signals is increasing or decreasing during a predetermined period. The alerting device is configured to generate an alert to the user or move the user away from the vehicle in response to a determination by the intensity determination module that the intensity of the ultrasonic signals is increasing during the predetermine period.

13 Claims, 2 Drawing Sheets

(56) References Cited

U.S. PATENT DOCUMENTS

Figure 1:
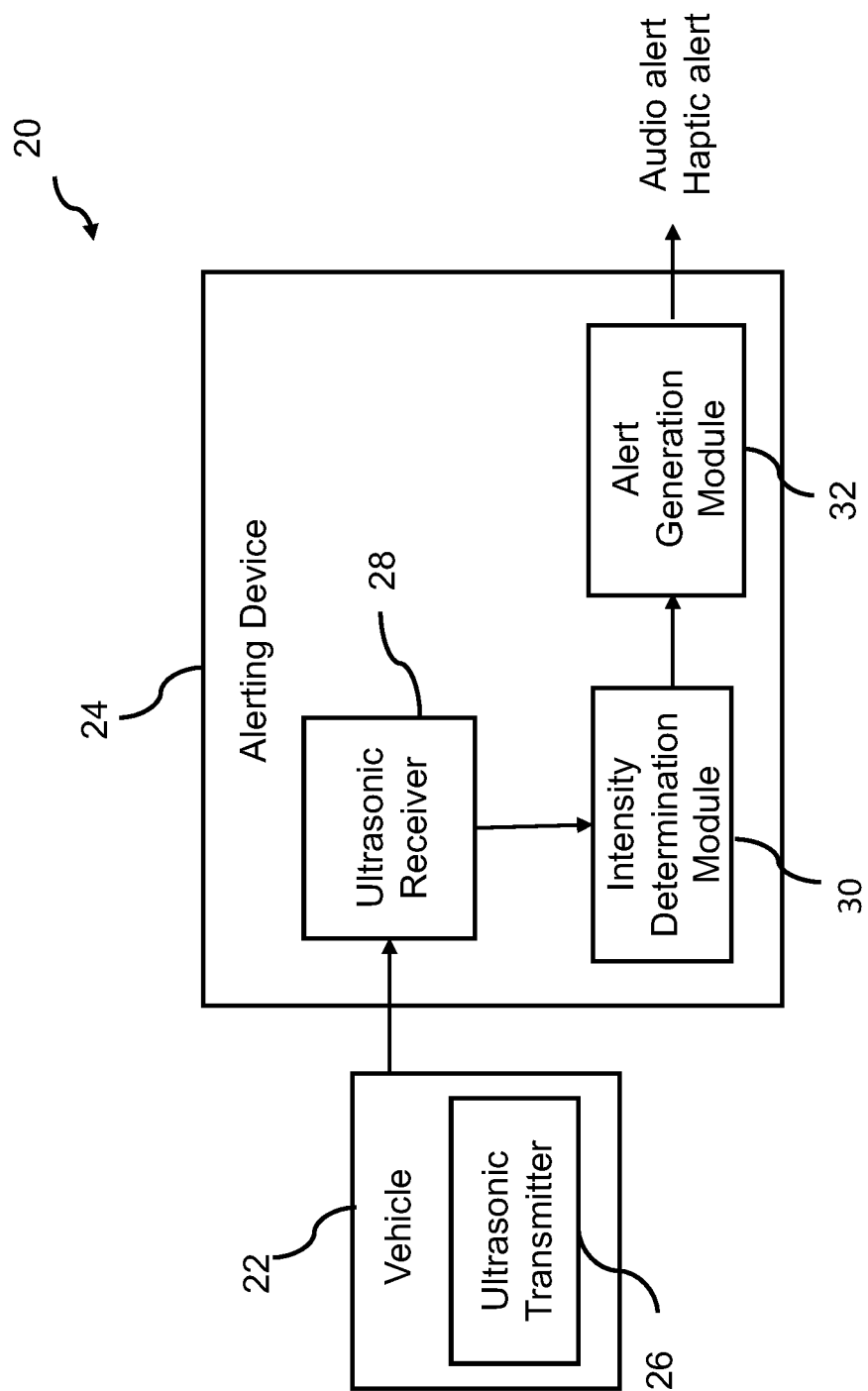

| | | | |
|---|---|---|---|
| 2016/0025854 A1 | | 1/2016 | D'Angelo et al. |
| 2017/0294132 A1 | | 10/2017 | Colmenares |
| 2021/0368310 A1 | * | 11/2021 | Hareuveni ............... G08B 5/36 |
| 2021/0398429 A1 | * | 12/2021 | Hawkins ................ G08G 1/052 |
| 2023/0145508 A1 | | 5/2023 | Kaphengst et al. |

FOREIGN PATENT DOCUMENTS

| | | |
|---|---|---|
| CN | 209529624 | 10/2019 |
| CN | 114002684 | 2/2022 |

\* cited by examiner

METHOD AND SYSTEM TO MITIGATE VEHICULAR CONTACTS IN AUTONOMOUSLY MARSHALLED MANUFACTURING USING ULTRASONICS

FIELD

The present disclosure relates to a system for mitigating a vehicular contact.

BACKGROUND

The statements in this section merely provide background information related to the present disclosure and may not constitute prior art.

With the advent of autonomous technology, a vehicle can be driven autonomously in an industrial/commercial setting alongside personnel (technicians, engineers, visitors etc.). The autonomous vehicles may cause potential vehicular contact with such personnel. The personnel may not notice the approaching of an autonomous vehicle or may not be alerted by another operator(s) in time due to the layouts and noisy nature of such environment.

The issues relating to personnel working alongside with autonomous vehicles particularly in manufacturing setting are addressed by the present disclosure.

SUMMARY

This section provides a general summary of the disclosure and is not a comprehensive disclosure of its full scope or all of its features.

In one form of the present disclosure, a system for alerting a user against a vehicular contact is provided. The system includes an alerting device, which includes an ultrasonic receiver configured to receive ultrasonic signals emitted by an ultrasonic transmitter of a vehicle, and an intensity determination module configured to determine whether an intensity of the ultrasonic signals is increasing or decreasing during a predetermined period. The alerting device is configured to generate an alert to the user or move the user away from the vehicle in response to a determination by the intensity determination module that the intensity of the ultrasonic signals is increasing during the predetermine period.

In other features, the alerting device includes an alert generation module configured to generate the alert, the alert being an audio alert or a haptic alert. The alerting device is a wearable device, which may be selected from a group consisting of an apparel, a necklace, a wristband, a bracelet, a watch, and an exoskeletal structure. As an example, the alerting device has an exoskeletal structure configured to move the user away from a moving path of the vehicle. The exoskeletal structure is a lower torso exoskeletal structure.

In still other features, the system further includes a movement determination module configured to determine a desired moving path for moving the user away from the vehicle. The movement determination module is configured to determine the desired moving path of the exoskeletal structure based on data from a memory of an external monitoring system and a location of the user. The memory stores information about a layout of a manufacturing plant and a moving path of the vehicle. The monitoring system is an infrastructure monitoring and control system for monitoring and controlling navigation of a plurality of vehicles including the vehicle in a manufacturing plant. The movement determination module is provided in the external monitoring system. The alerting device further includes a movement control module configured to move the exoskeletal structure according to the desired moving path.

In another form of the present disclosure, a system for alerting a user against a vehicular contact is provided. The system includes an alerting device configured having a wearable structure to be worn on the user and includes an ultrasonic receiver configured to receive ultrasonic signals emitted directly by an ultrasonic transmitter of the vehicle, and an intensity determination module configured to determine whether the intensity of the ultrasonic signals is increasing or decreasing during a predetermined period. The alerting device is configured to move the user away from the vehicle in response to a determination by the intensity determination module that the intensity of the ultrasonic signals is increasing during the predetermined period.

In other features, the alerting device includes an exoskeletal structure and includes a movement control module configured to move the exoskeletal structure out of a moving path of the vehicle. The system further includes a movement determination module configured to determine a desired moving path of the exoskeletal structure. The movement determination module is provided in a monitoring system external to the alerting device or integrated in the alerting device. The movement determination module is configured to determine the desired moving path of the exoskeletal structure based on data from a memory of an external monitoring system and a location of the user. The memory stores information about a layout of a manufacturing plant and a moving path of the vehicle. The vehicle is an autonomous vehicle in a manufacturing plant.

Further areas of applicability will become apparent from the description provided herein. It should be understood that the description and specific examples are intended for purposes of illustration only and are not intended to limit the scope of the present disclosure.

DRAWINGS

Figure 2:
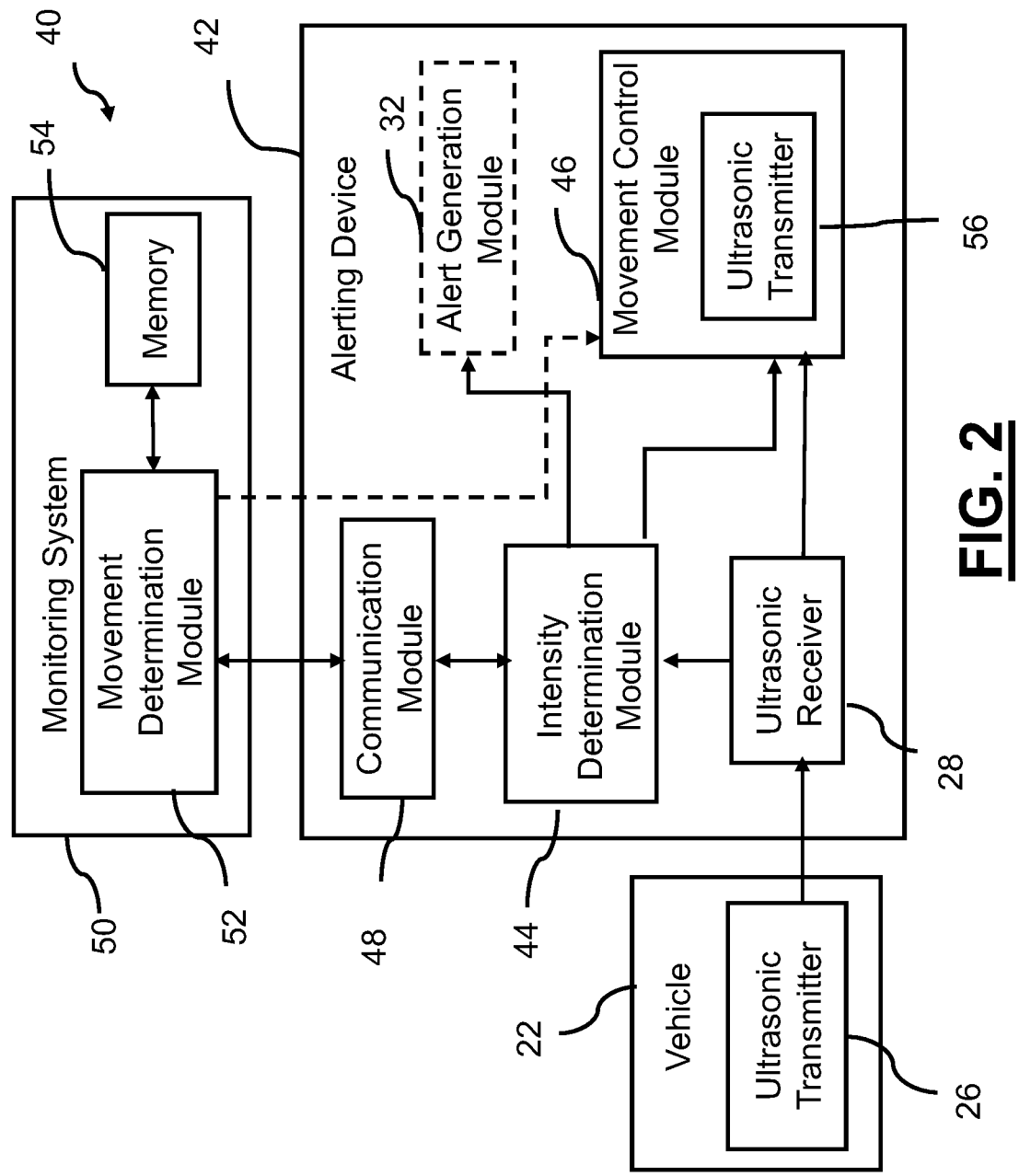

In order that the disclosure may be well understood, there will now be described various forms thereof, given by way of example, reference being made to the accompanying drawings, in which:

FIG. 1 is a schematic diagram of a system for alerting a user against a vehicular contact constructed in accordance with the teachings of the present disclosure; and FIG. 2 is a schematic diagram of a variant of a system for alerting a user against a vehicular contact constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system 20 for alerting a user against a contact with a vehicle 22 constructed in accordance with the teachings of the present disclosure includes an alerting device 24 to be carried or worn by a user. The vehicle 22 may be an autonomous vehicle running on the roads or an autonomously marshalled vehicle in a manufacturing plant. The users may be pedestrians walking on the roads or may be personnel working in the manufacturing plant alongside with the autonomously marshalled vehicle.

An autonomous vehicle is typically equipped with an ultrasonic transmitter 26 and an ultrasonic receiver (not shown) for detecting obstacles on the street or in the manufacturing plant to allow the autonomous vehicle to stay away from the obstacles. The ultrasonic transmitter 26 of the vehicle 22 is configured to emit ultrasonic waves/signals continuously or at a predetermined interval to the surrounding environment to detect obstacles. When an obstacle is nearby or on the way of the vehicle 22, the ultrasonic wave is reflected by the obstacle back to the vehicle 22 and received by the ultrasonic receiver in the vehicle. An onboard controller or a controller outside the vehicle 22 then determines a location or a position of the obstacle relative to the vehicle 22 based on the ultrasonic signals reflected by the obstacles and received by the ultrasonic receiver and navigates the vehicle 22 accordingly away from the obstacle.

The system 20 of the present disclosure takes advantage of the ultrasonic signals emitted directly from the ultrasonic transmitter 26 of the autonomous vehicle to alert a user against a contact with the vehicle 22. Therefore, it is understood that the vehicle 22 workable with the alerting device 24 does not have to be an autonomous vehicle but can be any vehicle as long as the vehicle 22 is provided an ultrasonic transmitter to emit ultrasonic waves/signals continuously or at a predetermined interval to the surrounding environment. The vehicle 22 does not need to have an ultrasonic receiver to be workable with the alerting device 24.

The alerting device 24 includes an ultrasonic receiver 28, an intensity determination module 30, and an alert generation module 32. The ultrasonic receiver 28 is configured to receive the ultrasonic signals emitted directly by the ultrasonic transmitter 26 of the vehicle 22. The intensity determination module 30 is configured to determine whether an intensity of the ultrasonic signals is increasing or decreasing in a predetermined period of time. As an example, the intensity determination module 30 may compare the ultrasonic signals received at two different times and determine whether the ultrasonic signals received at a later time are stronger than the ultrasonic signal received at an earlier time. When the intensity determination module 30 determines that the intensity of the ultrasonic signals is increasing in the predetermined period, it can be determined that the vehicle 22 is moving closer to the user. In response to the determination that the intensity of the ultrasonic signals is increasing, the alert generation module 32 generates an alert to the user such that the user can respond to the alert and move out of the way of the vehicle 22. The alert generation module 32 may be in the form of a buzzer that provides an audio alert or a vibrator that provides a haptic alert. It is understood that the alert generation module 32 can be in any form as long as it can generate an alert to the user without departing from the scope of the present disclosure.

In one form, the alerting device 24 may be a wearable device, such as an apparel, a jewelry, a wristband, a watch, or a necklace. In another form, the alerting device 24 is not a wearable, but can be an object that can be carried in a user's pocket, such as a key, a card, or a pen. In still another form, the alerting device 24 may be in the form of an application installed in a smart phone. It is understood that the alerting device 24 can take any form as long as it can receive ultrasonic signals emitted directly from the vehicle 22, determine the intensity of the ultrasonic signals received from the vehicle 22, and generate an alert to the user based on the determination of the intensity of the ultrasonic signals.

Referring to FIG. 2, a variant of a system 40 for alerting a user against a vehicular contact includes an alerting device 42 that is functionally similar to the alerting device 24 of FIG. 1, with further implementation to help move the user out of the way of a vehicle 22 in response to an alert that the vehicle 22 is approaching. Therefore, like elements will be designated by like reference characters and thus the detailed description thereof is omitted herein for clarity.

More specifically, the system 40 for alerting a user against a vehicular contact includes the alerting device 42 and a monitoring system 50 external to the alerting device 42. The alerting device 42 includes an ultrasonic receiver 28 for detecting and receiving ultrasonic signals emitted directly from the ultrasonic transmitter 26 of the vehicle 22, an intensity determination module 44, a movement control module 46, a communication module 48, and optionally an alert generation module 32.

The alerting device 42 may have a lower torso exoskeletal structure designed to be worn on the legs of the user. Similar to the intensity determination module 30 of FIG. 1, the intensity determination module 44 is configured to determine whether the intensity of the ultrasonic signals received by the ultrasonic receiver 28 during a predetermined period is increasing or decreasing. In addition, the intensity determination module 44 is further configured to send data relating to a desired moving path for the lower torso exoskeletal structure to the movement control module 46, which in turns, controls and moves the lower torso exoskeletal structure of the alerting device 42 out of the way of the vehicle or to a work area accordingly.

When the intensity determination module 44 determines that the intensity of the ultrasonic signals is increasing during a predetermined period, the intensity determination module 30 sends signals through the communication module 48 to the monitoring system 50 indicating a location of the user and requesting information about the desired moving path of the exoskeletal structure.

The communication module 48 may be a wireless communication device using a wireless communication protocol, such as a Bluetooth®-type protocol, a cellular protocol, a wireless fidelity (Wi-Fi)-type protocol, a near-field communication (NFC) protocol, an ultra-wideband (UWB) protocol, among others.

The monitoring system 50 may be an infrastructure monitoring and control system configured to monitor and control navigation of the vehicles 22 in the manufacturing plant. The monitoring system 50 includes a movement determination module 52 and a memory 54. The memory 54 is configured to store data relating to the manufacturing plant and the vehicles 22, such as a layout of the manufacturing plant, moving paths of the vehicles 22, obstacles in the plant, and predetermined areas that are outside the moving paths of the vehicles 22 (such as work areas). The movement determination module 52 is configured to retrieve the data prestored in the memory 54 and determine the desired moving path of the exoskeletal structure of the alerting device 42 based on the location of the user and the data retrieved from the memory 54. The desired moving path is a path for moving the user to one of the predetermined areas that are outside a vehicle moving path (such as work areas). As an example, the desired moving path is a path to move the user to one of the predetermined areas that is closest to the user.

The data relating to the desired moving path of the exoskeletal structure are sent to the intensity determination module 44, which in turns, transmits the data to the movement control module 46 such that the movement control module 46 can move the exoskeletal structure according to the desired moving path to the selected one of the predetermined areas that is closest to the user. Alternatively, the data relating to the desired moving path of the exoskeletal structure and a selected one of the predetermined areas may be transmitted directly from the movement determination module 52 to the movement control module 46, which then moves the exoskeletal structure accordingly.

The movement control module 46 may further include an ultrasonic transmitter 56 for emitting ultrasonic sound wave continuously or at a predetermined interval to detect an obstacle, if any, which may be randomly or temporarily placed in the manufacturing plant and is not known to the monitoring system 50, during movement of the exoskeletal structure. The signals reflected by the obstacles may be received by the ultrasonic receiver 28 and transmitted to the movement control module 46. The movement control module 46 may be further configured to determine the location of the obstacle in the desired moving path of the exoskeletal structure and modify the desired moving path to stay away from the obstacle.

Alternatively, the movement determination module 52 may be integrated in the alerting device 42, instead of being provided in the monitoring system 50, to determine the desired moving path of the exoskeletal structure based on the data retrieved from the memory 54 of the monitoring system 50 and the location of the user.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for alerting a user against a vehicular contact, the system comprising:
    an alerting device comprising:
        an ultrasonic receiver configured to receive ultrasonic signals emitted by an ultrasonic transmitter of a vehicle; and
        an intensity determination module configured to determine whether an intensity of the ultrasonic signals is increasing or decreasing during a predetermined period;
    a lower torso exoskeletal structure designed to be worn on legs of the user; and
    a movement control module in communication with the alerting device;
    wherein the alerting device is configured to generate a signal in response to a determination by the intensity determination module that the intensity of the ultrasonic signals is increasing during the predetermined period, the intensity determination module configured to, in response to receiving the signal, send data relating to a desired moving path for the lower torso exoskeletal structure to the movement control module, which then controls and moves the lower torso exoskeletal structure out of a moving path of the vehicle.

2. The system according to claim 1, wherein the alerting device further comprises an alert generation module configured to generate an alert to the user, the alert being an audio alert or a haptic alert.

3. The system according to claim 1, further comprising a movement determination module configured to determine the desired moving path.

4. The system according to claim 3, wherein the movement determination module is configured to determine the desired moving path of the lower torso exoskeletal structure based on data from a memory of a monitoring system external to the alerting device and a location of the user.

5. The system according to claim 4, wherein the memory stores information about a layout of a manufacturing plant and the moving path of the vehicle.

6. The system according to claim 4, wherein the monitoring system is an infrastructure monitoring and control system for monitoring and controlling navigation of a plurality of vehicles including the vehicle in a manufacturing plant.

7. The system according to claim 4, wherein the movement determination module is provided in the monitoring system.

8. A system for alerting a user against a vehicular contact, the system comprising:
- an alerting device comprising:
  - an ultrasonic receiver configured to receive ultrasonic signals emitted directly by an ultrasonic transmitter of a vehicle;
  - an intensity determination module configured to determine whether an intensity of the ultrasonic signals is increasing or decreasing during a predetermined period;
  - a lower torso exoskeletal structure designed to be worn on legs of the user; and
  - a movement control module; and
- a movement determination module in communication with the movement control module;
- wherein the movement determination module is configured to determine and send data relating to a desired moving path for the lower torso exoskeletal structure to the movement control module in response to a determination by the intensity determination module that the intensity of the ultrasonic signals is increasing during the predetermined period, the movement control module configured to control and move the lower torso exoskeletal structure according to the desired moving path for the lower torso exoskeletal structure.

9. The system according to claim 8, wherein the movement determination module is provided in a monitoring system external to the alerting device.

10. The system according to claim 8, wherein the movement determination module is integrated in the alerting device.

11. The system according to claim 8, wherein the movement determination module is configured to determine the desired moving path of the lower torso exoskeletal structure based on data from a memory of an external monitoring system and a location of the user.

12. The system according to claim 11, wherein the memory stores information about a layout of a manufacturing plant and the moving path of the vehicle.

13. The system according to claim 8, wherein the vehicle is an autonomous vehicle in a manufacturing plant.

* * * * *